United States Patent [19]

Lingo et al.

[11] Patent Number: 5,735,384
[45] Date of Patent: Apr. 7, 1998

[54] ENDLESS ACCUMULATING CONVEYOR

[75] Inventors: Kenneth B. Lingo, Shelby Township; John H. Nolan, Harrison Township, both of Mich.

[73] Assignee: Western Atlas, Inc., Hebron, Ky.

[21] Appl. No.: 705,183

[22] Filed: Aug. 29, 1996

[51] Int. Cl.⁶ .................................................. B65G 15/00
[52] U.S. Cl. ................................... 198/465.1; 198/343.1
[58] Field of Search .......................... 198/343.1, 343.2, 198/465.1, 795, 803.01; 104/172.3

[56] References Cited

U.S. PATENT DOCUMENTS

| | | | |
|---|---|---|---|
| 4,088,220 | 5/1978 | Jacksch et al. | 198/343.2 X |
| 4,712,670 | 12/1987 | Burkhardt | 198/465.1 X |
| 4,757,893 | 7/1988 | Shabram, Jr. et al. | 104/172.3 X |
| 5,220,996 | 6/1993 | Noestheden | 198/465.1 |
| 5,280,830 | 1/1994 | Schiaretti et al. | 198/795 X |
| 5,388,684 | 2/1995 | Peck | 198/465.1 |

FOREIGN PATENT DOCUMENTS 2431244  12/1975  Germany .................. 198/343.1

*Primary Examiner*—James R. Bidwell
*Attorney, Agent, or Firm*—Barnes, Kisselle, Raisch, Choate, Whittemore & Hulbert, P.C.

[57] ABSTRACT

An endless accumulating conveyor has upper and lower guide rails for supporting pallets. An endless roller chain has an upper run extending along the upper guide rails and a lower run extending along the lower guide rails. A dogging device on each pallet is engageable between the rollers of the chain to move the pallet with the chain along the upper and lower runs. A friction clutch for the dogging device of each pallet causes the dogging device to release and slip past the rollers of the chain when the pallet encounters a predetermined resistance to movement, as when it is desired to accumulate pallets. Mechanism is provided for positively propelling each pallet over the curved section at both ends of the conveyor from one run to the other without slipping.

16 Claims, 4 Drawing Sheets

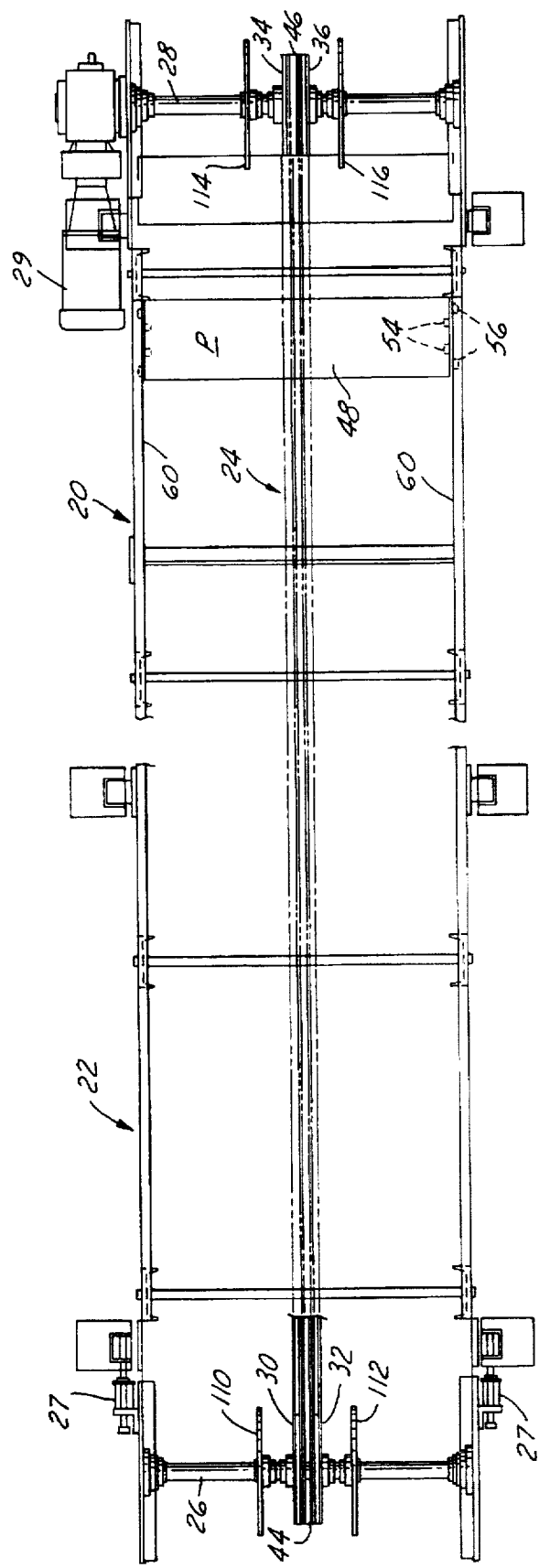
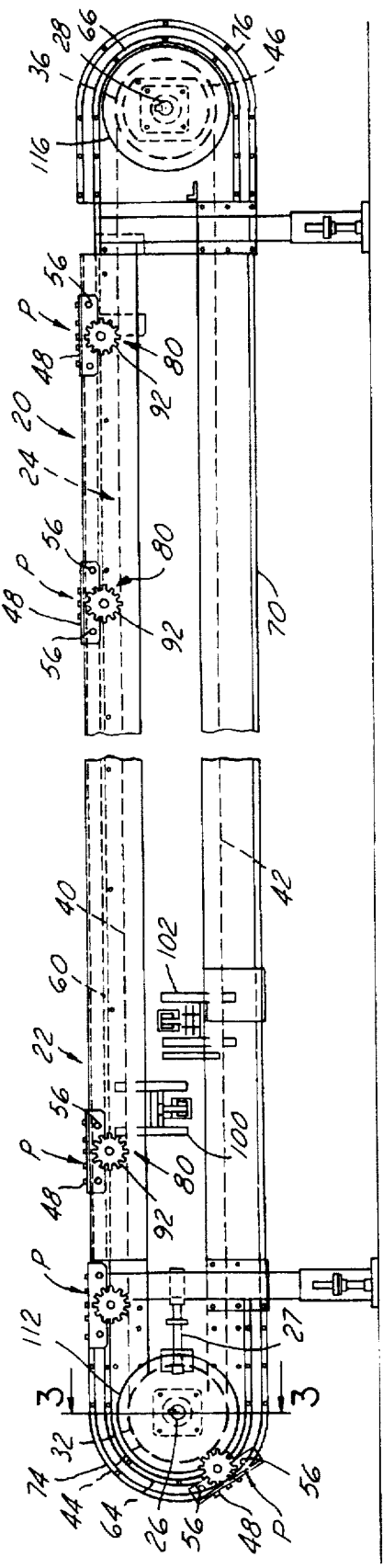
FIG. 1
FIG. 2

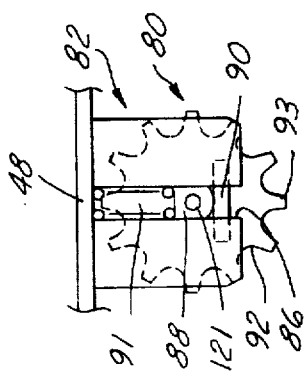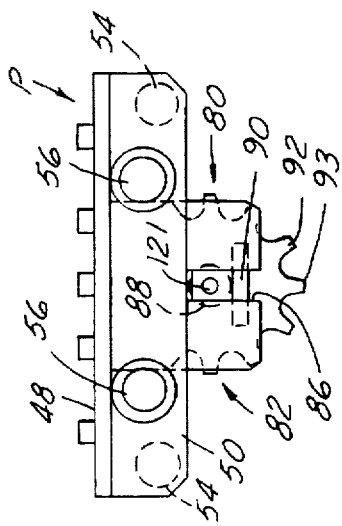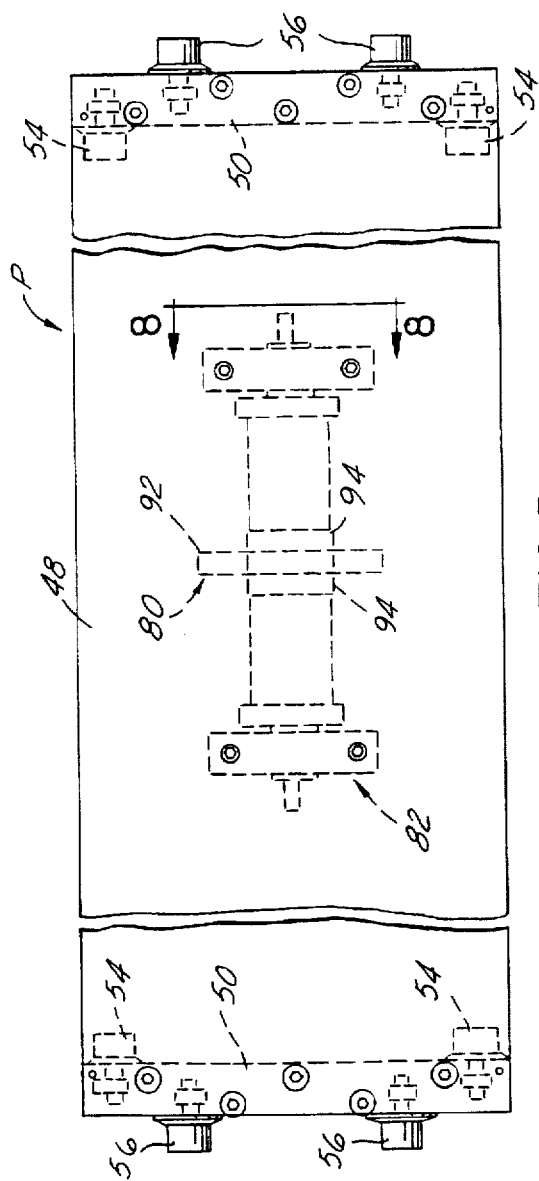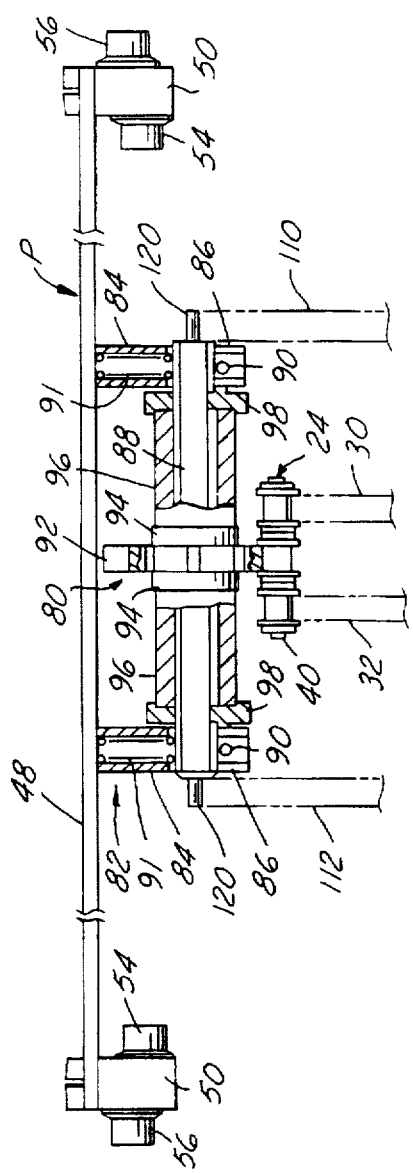

5,735,384

ENDLESS ACCUMULATING CONVEYOR

FIELD OF INVENTION

This invention relates generally to conveyors and more particularly to endless accumulating conveyors of the under/over type.

BACKGROUND OF THE INVENTION

An endless accumulating conveyor of the under/over type has upper and lower runs and is adapted to slidably support pallets and frictionally transport them over both the upper and lower runs. A conventional under/over conveyor typically has a pallet return drive system along with an elevator and lowerator at each end of the conveyor which add greatly to the overall cost of the installation. What is needed is a conveyor system which eliminates the pallet return drive, the elevator and the lowerator, and is capable of positively propelling the pallets around one or both ends of the conveyor from one run to the other.

SUMMARY OF THE INVENTION

In accordance with the present invention, an endless flexible roller chain has upper and lower runs connected at the ends of the conveyor by curved sections. A drive is provided for orbiting the chain including drive sprockets meshing with the curved sections of the chain at both ends of the conveyor. A dogging device on each pallet is engageable between rollers of the chain to move the pallet with the chain. Preferably, a friction clutch is provided for each dogging device to enable it to release and slip past the rollers of the chain when the pallets encounter a predetermined resistance to movement. In this way, pallets may be held back and accumulated along either the upper and lower run when and if desired, without interrupting the orbital movement of the chain.

Preferably, the dogging device comprises a rotatable pallet sprocket which is mounted on the pallet for bodily movement toward and away from the chain. Variations in the distance between the chain and the pallet sprocket can occur particularly at the ends of the conveyor, which is accommodated by the ability of the pallet sprocket to move either toward or away from the chain.

Further in accordance with the invention, each pallet is positively propelled over the curved section at one or both ends of the conveyor from one run to the other without slip, and for this purpose one or more additional drive sprockets are provided.

One object of this invention is to provide an under/over conveyor having the foregoing features and capabilities.

Another object is to provide an under/over conveyor having a pallet drive which is composed of a relatively few simple parts, is rugged and durable in use, and is capable of being readily manufactured and assembled.

BRIEF DESCRIPTION OF THE DRAWINGS

These and other objects, features and advantages of the invention will become more apparent as the following description proceeds, especially when considered with the accompanying drawings.

FIG. 1 is a top view, with parts broken away, of an under/over conveyor constructed in accordance with the invention.

FIG. 2 is a side view of the conveyor shown in FIG. 1.

FIG. 5 is a top view, with parts broken away, of one of the pallets employed with the conveyor of this invention.

FIG. 6 is a side view of the pallet of FIG. 5, with parts in section.

FIG. 7 is an end view of the pallet of FIGS. 5 and 6.

FIG. 8 is a sectional view taken on the line 8—8 in FIG. 5.

DETAILED DESCRIPTION

Figure 3:
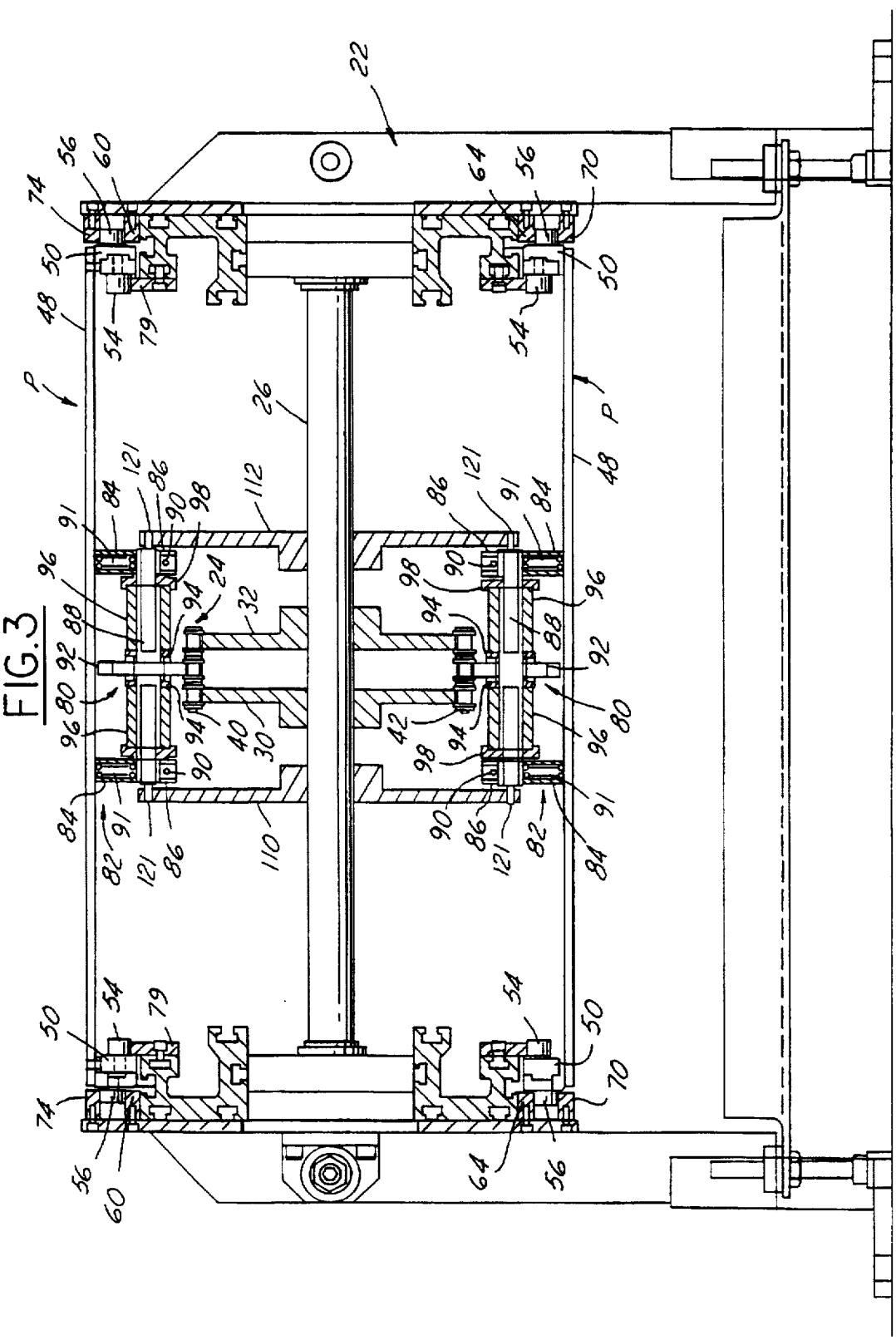
FIG. 3 is a sectional view taken on the line 3—3 in FIG. 2.
Figure 4:
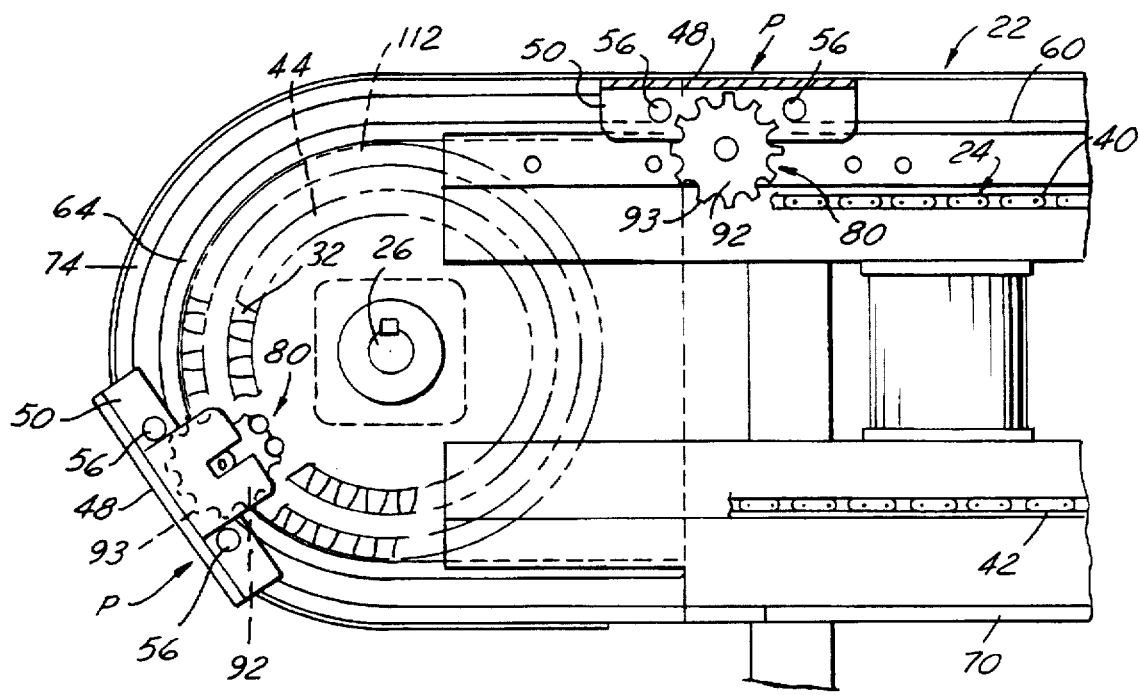
FIG. 4 is an enlarged fragmentary view of a portion of the conveyor shown in FIG. 2.

Referring now more particularly to the drawings, the conveyor 20 has an elongated frame 22 supporting an endless 3-strand roller chain 24 extending lengthwise thereof.

A transverse horizontal shaft 26 is journalled for rotation in a chain tensioning device 27 at one end of the frame. A transverse horizontal shaft 28 is journalled for rotation on the frame at the opposite end thereof. A motor 29 is provided to rotate the shaft 28.

Sprockets 30 and 32 are keyed to shaft 26 in laterally spaced-apart relation. Sprockets 34 and 36 are keyed to shaft 28 in laterally spaced-apart relation. The chain 24 extends over sprockets 30.32 and over sprockets 34.36 with the sprocket teeth engaging between the rollers of the two outermost strands of the chain. The chain has upper and lower runs 40 and 42 connected at their ends by curved sections 44 and 46 extending around the sprockets.

The conveyor 20 is designed to slidably support and locate pallets P and to transport them over both the upper and lower runs and over the curved sections at the ends of the conveyor. The pallets are preferably in the form of rectangular platforms 48 with laterally spaced-apart side rails 50 on the bottom of the platforms extending in the direction of movement of the conveyor chain. Inboard rollers 54 and outboard rollers 56 are mounted on the side rails.

Laterally spaced-apart, parallel, upper horizontal guide rails 60 are secured to and extend lengthwise of the frame along opposite sides of the upper run of the conveyor chain. At the ends of the conveyor, the upper guide rails 60 curve in an arc as shown at 64 and 66, the arcs being centered on and extending around the shafts 26 and 28. The guide rails 60 are engaged by the outboard rollers 56 of the pallets to support the pallets as they are moved along the top run of the conveyor.

Laterally spaced-apart, parallel, lower horizontal guide rails 70 are secured to and extend lengthwise of the frame along opposite sides of the lower run of the conveyor chain. At the ends of the conveyor, the lower guide rails curve in an arc as shown at 74 and 76, the arcs being centered on and extending around the shafts 26 and 28. These lower guide rails are engaged by the outboard rollers 56 of the pallets to support the pallets as they are moved along the bottom run of the conveyor. The arcuate portions 64 and 66 of the upper guide rails and the arcuate portions 74 and 76 of the lower guide rails are concentric and spaced apart a sufficient distance to confine an guide the pallet rollers 56 when the pallets are propelled around the ends of the conveyor from one run to the other.

FIG. 3 shows that there are additional curved rails 79 around the ends of the conveyor on which the inboard pallet rollers 54 travel. Rails 79 are concentric with rails 64,66 at one end and rails 74,76 at the other end.

Each pallet has a dogging device 80 which engages the chain to cause the pallets to move with the chain along the upper and lower runs. Each dogging device has a frame 82 comprising two laterally spaced-apart, parallel tubular posts 84 which project downwardly from the platform. The lower ends of the posts have vertical slots 86 to slidably receive the ends of a horizontal sub shaft 88. The stub shaft is retained in the slots by a pin 90 across the bottom of each post. A compression coil spring 91 in each post presses on the ends of the stub shaft 88, forcing the shaft downwardly toward the pins 90.

A sprocket 92 is rotatably mounted on the stub shaft 88 of each dogging device midway between the ends thereof. A friction clutch comprising pads 94 of friction material sleeved on the stub shaft are pressed against the sides of the sprocket 92 by compression members 96 which encircle the shaft on opposite sides of the sprocket and are held in compression by retainers 98 on the shafts. The compression member 96 may be coil springs or in this instance compressible tubes held in compression by the retainers 98. The friction clutch pads 94 frictionally resist rotation of the sprocket 92.

The sprocket 92 has teeth 93 which engage between rollers of the center strand of the chain 24, and because the sprocket is normally held from rotation by the friction clutch pads 94, the pallet will be caused to move with the chain. However, should the pallet encounter a predetermined amount of resistance to movement, the clutch will slip allowing sprocket 92 to rotate and the sprocket teeth 93 to ride over the rollers of the chain so that the pallet may be held back for accumulation purposes as by means of the retarders 100 and 102 provided along the top and bottom runs.

Mechanism is provided for positively propelling the pallets around the curved sections of the chain at opposite ends of the conveyor. This propelling mechanism includes sprockets 110 and 112 which are affixed to the shaft 26 on opposite sides of the sprockets 30 and 32 and sprockets 114 and 116 affixed to the shaft 28 on opposite sides of sprockets 34 and 36. The stub shaft 88 of the dogging device has pins 120 projecting axially from the opposite ends thereof which are engageable between the teeth 121 of the sprockets 110,112 or 114,116 when the pallets move across or around either end of the conveyor from one run to the other. Thus, the sprockets 110–116 provide a positive drive for the pallets ensuring that they will move from one run to the other without slipping because they are not affected by the action of the friction clutch pads 94.

The springs 92 in the dogging device 80 of each pallet ensure that the sprocket 92 will engage the roller chain 24 at all times. Around the ends of the conveyor, the spacing between the sprocket 92 and the chain 24 may vary, but this is of no consequence because the pallets are positively propelled by the sprockets 110,112 or 114,116 as they move from one run to the other. The depth, size and shape of the spaces between the teeth of the sprockets 110–116 is sufficient to maintain a driving engagement with the pins 120 despite radial variations in the movement of the pallets around the ends. Hence, the pallets move around the end without any possibility of slipping. The pallets are closely guided around the conveyor ends by the cooperation of curved rails 64, 74 and 79 at one end of the curved rails 66, 76 and 79 at the other end, keeping the sprockets 110–116 in engagement with the pins 120.

The conveyor of this invention requires less power to operate, can be longer and have a greater load-carrying capacity than prior constructions.

What is claimed is:

1. An elongated accumulating conveyor comprising laterally spaced-apart upper guide rails and laterally spaced-apart lower guide rails extending lengthwise of said conveyor, pallets adapted to be slidably supported on said upper guide rails and on said lower guide rails, an endless, flexible roller chain having an upper run between and parallel to said upper guide rails and a lower run between and parallel to said lower guide rails, said upper and lower runs being connected at the ends of said conveyor by curved sections thereof, a drive for orbiting said chain including a first drive sprocket mounted for rotation at one end of the conveyor and meshing with the curved section of the chain at said one end of the conveyor, a dogging device on each pallet having a rotatable sprocket engageable between adjacent rollers of said chain to move the pallet with said chain along said supper and lower runs, a friction clutch for the dogging device on each pallet operably associated with the rotatable sprocket to resist rotation of the sprocket and to permit the sprocket to rotate to cause the dogging device to release and slip past the rollers of said chain when said pallet encounters a predetermined resistance to movement, mechanism for positively propelling each pallet over the curved section at one end of the conveyor from one run to the other without slip comprising a second drive sprocket rotatable as a unit with and on the same axis as said first drive sprocket, and an abutment on each pallet engageable with said second drive sprocket.

2. An accumulating conveyor as defined in claim 1, and further including end guide rails for guiding each pallet over the curved section at one end of the conveyor from one run to the other.

3. An accumulating conveyor as defined in claim 1, wherein said second drive sprocket has sprocket teeth separated by spacers therebetween which are of a depth, size and shape sufficient to drivingly receive the pallet abutments despite variations in the radius of the arcuate paths of the abutments around said one end of the conveyor.

4. An elongated accumulating conveyor comprising laterally spaced-apart upper guide rails and laterally spaced-apart lower guide rails extending lengthwise of said conveyor, pallets adapted to be slidably supported on said upper guide rails and on said lower guide rails, an endless, flexible roller chain having an upper run between and parallel to said upper guide rails and a lower run between and parallel to said lower guide rails, said upper and lower runs being connected at the ends of said conveyor by curved sections thereof, a drive for orbiting said chain including a first drive sprocket mounted for rotation at one end of the conveyor and meshing with the curved section of the chain at said one end of the conveyor, a pallet-advancing unit on each said pallet, each said pallet-advancing unit having a dogging device having a rotatable sprocket engageable between adjacent rollers of said chain to move the pallet with said chain along said upper and lower runs, a friction clutch for each said dogging device operably associated with the rotatable sprocket to resist rotation of the sprocket and to permit the sprocket to rotate to cause the dogging device to release and slip past the rollers of said chain when said pallet encounters a predetermined resistance to movement, mechanism for positively propelling each pallet over the curved section at one end of the conveyor from one run to the other comprising a second drive sprocket rotatable as a unit with and on the same axis as said first drive sprocket, and an abutment on each said pallet-advancing unit engageable with said second drive sprocket.

5. An accumulating conveyor as defined in claim 4, and further including end guide rails for guiding each pallet over the curved section at one end of the conveyor from one run to the other.

6. An accumulating conveyor as defined in claim 5, wherein each said dogging device comprises a guide mounting each said pallet sprocket for rotation and for bodily movement toward and away from said chain, and spring means urging each said pallet sprocket toward said chain for engagement therewith.

7. An accumulating conveyor as defined in claim 6, wherein each said clutch resists rotation of the pallet sprocket of the associated pallet-advancing unit.

8. An accumulating conveyor as defined in claim 5, wherein each of said pallet-advancing units comprise a frame, each said dogging device comprises a stub shaft mounting said pallet sprocket for rotation, a guide on each of said frames mounting said stub shaft for bodily movement toward and away from said chain, spring means urging said stub shaft toward said chain for engagement of the pallet sprocket thereon with said chain, and each said clutch comprises a clutch member mounted on said stub shaft and resisting rotation of said pallet sprocket.

9. An accumulating conveyor as defined in claim 8, wherein said guide on each of said frames comprises laterally spaced posts on opposite sides of said pallet sprocket which are slotted to slidably receive said stub shaft for the aforesaid bodily movement thereof.

10. An accumulating conveyor as defined in claim 9, wherein said posts are tubular and said spring means comprise coil springs compressed within said respective posts.

11. An accumulating conveyor as defined in claim 10, wherein said clutch comprises a second clutch member, said clutch members being sleeved on said stub shaft on opposite sides of said pallet sprocket in frictional engagement therewith.

12. An accumulating conveyor as defined in claim 11, wherein said mechanism for positively propelling each pallet comprises a third drive sprocket rotatable as a unit with and on the same axis as said second drive sprocket, and a second abutment on each said pallet-advancing unit engageable with said third drive sprocket.

13. An accumulating conveyor as defined in claim 12, wherein said first, second and third drive sprockets are mounted on a common drive shaft with said second and third drive sprockets on opposite sides of said first drive sprocket, and said abutments are pins projecting axially from opposite ends of said stub shaft.

14. An accumulating conveyor as defined in claim 13, wherein said second and third drive sprockets have sprocket teeth separated by spaces therebetween which are of a depth, size and shape sufficient to drivingly receive the pins despite variations in the radius of the arcuate paths of the pins around said one end of the conveyor.

15. An elongated accumulating conveyor comprising:

a pair of laterally spaced-apart upper guide rails for carrying pallets and laterally spaced-apart lower guide rails for carrying pallets, a plurality of pallets each constructed to be carried by the upper guide rails and the lower guide rails for being advanced along the upper and lower guide rails, an endless loop of a flexible roller chain having an upper run between and parallel to the upper guide rails, a lower run between and parallel to the lower guide rails and curved sections at the ends of the loop of the roller chain, a drive for advancing the chain along the upper and lower runs and having a drive sprocket mounted for rotation adjacent one end of the conveyor and meshing with the curved chain adjacent said one end of the conveyor, a dogging device on each pallet having a sprocket journalled for rotation and engageable with the chain to move the pallet along the upper and lower guide rails, and a friction clutch operably associated with the sprocket to resist rotation of the sprocket for advancing the pallet along the upper and lower guide rails by the moving chain, and to permit the sprocket to rotate to permit the rollers of the chain to advance by the pallet when the pallet encounters a predetermined resistance to movement.

16. An accumulating conveyor as defined in claim 15, wherein each said dogging device comprises a guide mounting each said pallet sprocket for rotation and for bodily movement toward and away from said chain, and spring means urging each said pallet sprocket toward said chain for engagement therewith.

* * * * *